United States Patent [19]
Sarangdhar et al.

[11] Patent Number: 5,659,689
[45] Date of Patent: Aug. 19, 1997

[54] METHOD AND APPARATUS FOR TRANSMITTING INFORMATION ON A WIRED-OR BUS

[75] Inventors: Nitin Sarangdhar, Beaverton; Samuel E. Calvin, Portland, both of Oreg.

[73] Assignee: Intel Corporation, Santa Clara, Calif.

[21] Appl. No.: 206,091

[22] Filed: Mar. 1, 1994

[51] Int. Cl.$^6$ .............................. G06F 13/38; G06F 13/40
[52] U.S. Cl. ............................................ 395/306; 395/287
[58] Field of Search .................................... 395/550, 444, 395/445, 446, 473, 200.13, 200.19, 447, 305, 733–742

[56] References Cited

U.S. PATENT DOCUMENTS

| | | | |
|---|---|---|---|
| 4,120,029 | 10/1978 | Steiner | 364/200 |
| 4,500,988 | 2/1985 | Bennett et al. | 370/85 |
| 5,029,076 | 7/1991 | Stewart et al. | 364/200 |
| 5,343,503 | 8/1994 | Goodrich | 375/121 |

FOREIGN PATENT DOCUMENTS

A100131658  7/1983  European Pat. Off. ........ G06F 15/16

OTHER PUBLICATIONS

"PCI Local Bus Specification Revision 2.1", pp. ii, 3 and 7–15 1993.
Uffenbeck, John, "The 8086/8088 Family, Design, Programming, and Interfacing", pp. 319–321 1987.
Popescu, et al., "The Metaflow Architecture," IEEE Micro, pp. 10–13 and 63–73, Jun. 1991.
"Futurebus+", prepared by the P896 Working Group of the Microprocessor Standards Committee, IEEE Computer Society Press, Feb. 14, 1990, cover page and page No. XVii.

Primary Examiner—Jack B. Harvey
Assistant Examiner—Jigar Pancholi
Attorney, Agent, or Firm—Blakely, Sokoloff, Taylor & Zafman

[57] ABSTRACT

A method and apparatus for use in transmitting information on a wired-OR signal line is described which employs a data transfer protocol exploiting the generally shorter signal settling time occurring following high to low signal voltage transitions than occurs following low to high signal voltage transitions. In accordance with the protocol, the transmission of meaningful information on multiple-driver signal lines is restricted to the assertion of high to low signal voltage transitions. By asserting meaningful information only on high to low transitions, the clock period for the bus may be set based on the voltage settling time resulting from only high to low transitions rather than from arbitrary transitions. As a result, the transmission of meaningful signals are all within the limits of incident wave switching and a high overall information transmission rate is achieved. The amount of information transferable per clock cycle depends upon whether the wired-OR signal line is a single driver line, a multiple driver line wherein events are correlated with commonly observable events, or a multiple driver line wherein events are not correlated with commonly observable events. For single driver lines, one unit of information per clock cycle may be transmitted. For multiple driver lines which are correlated with commonly observable events, one unit of information may be transmitted every two clock cycles. For multiple driver lines which are not correlated with commonly observable events, one unit of information per three clock cycles may be transmitted. Method and apparatus embodiments of the invention are described in particular with reference to a multiprocessor computer system having a latched wired-OR bus.

35 Claims, 9 Drawing Sheets

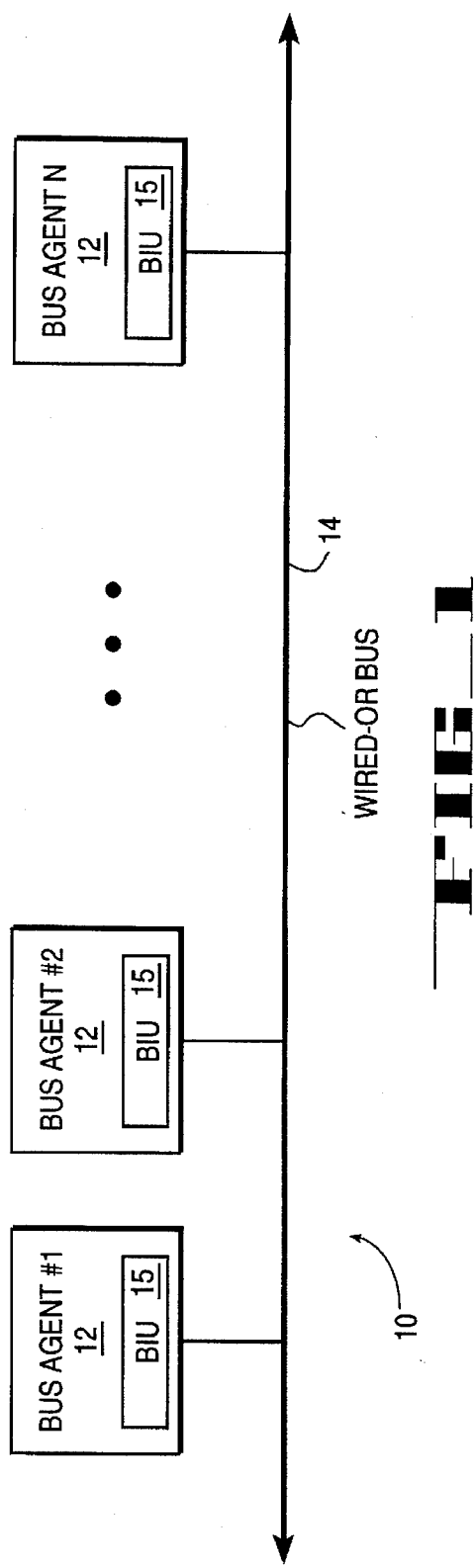

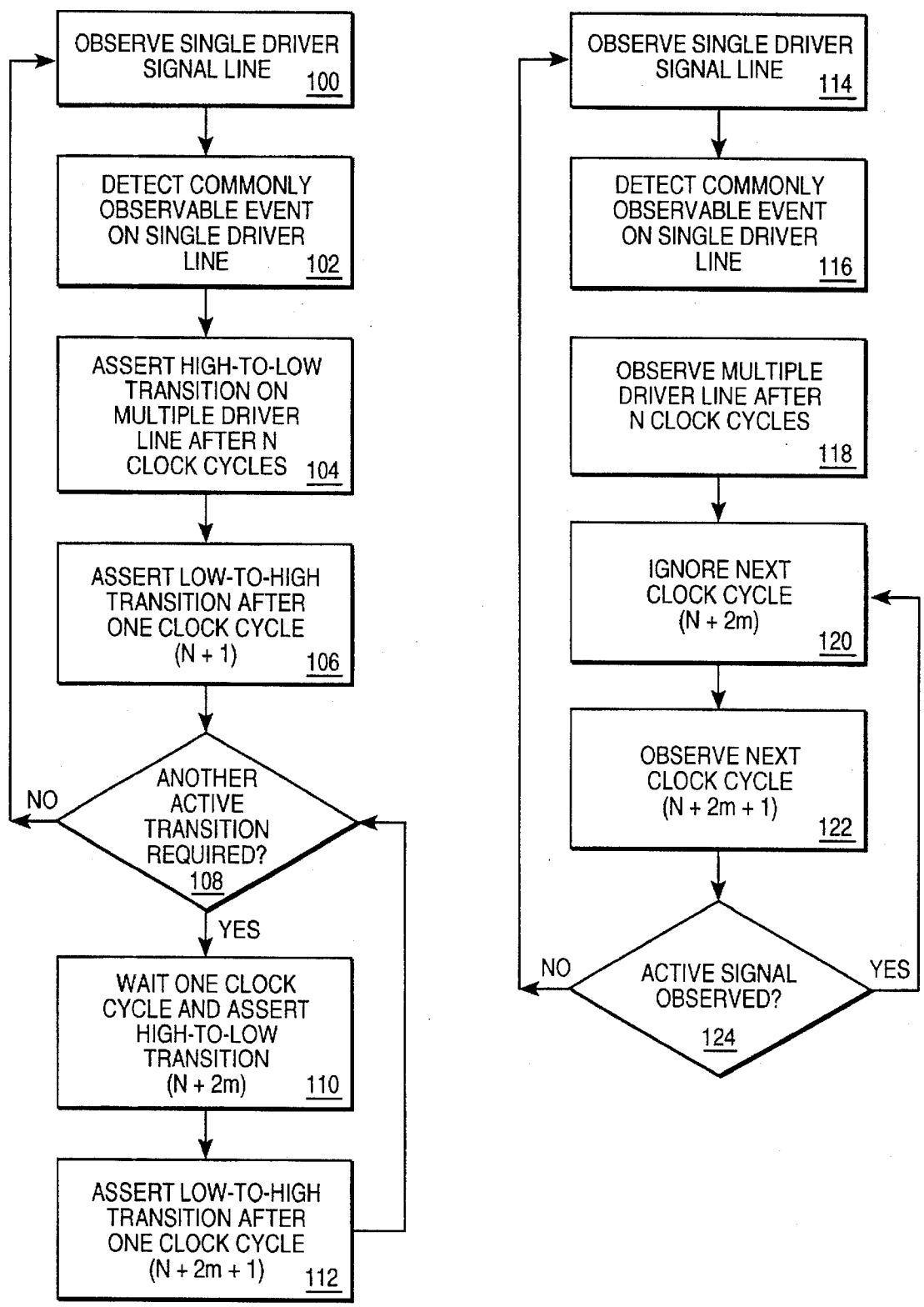
FIG_3

|  | T0 | T1 | T2 | T3 | T4 | T5 | T6 | T7 | T8 | T9 |
|---|---|---|---|---|---|---|---|---|---|---|
| SINGLE DRIVER LINE | L | H | H | H | L | H | L | H | H |  |
| DRIVER #1 | H | H | L | H | H | H | L | H | H |  |
| DRIVER #2 | H | H | H | H | H | H | L | H | H |  |
| ACTUAL MULTIPLE-DRIVER SIGNAL | H | H | L | H | H | H | L | H | H |  |
| MULTIPLE-DRIVER LINE OBSERVER |  | — | — | L | — | H | — | L | — | H |
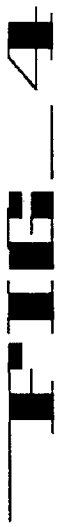
FIG—4

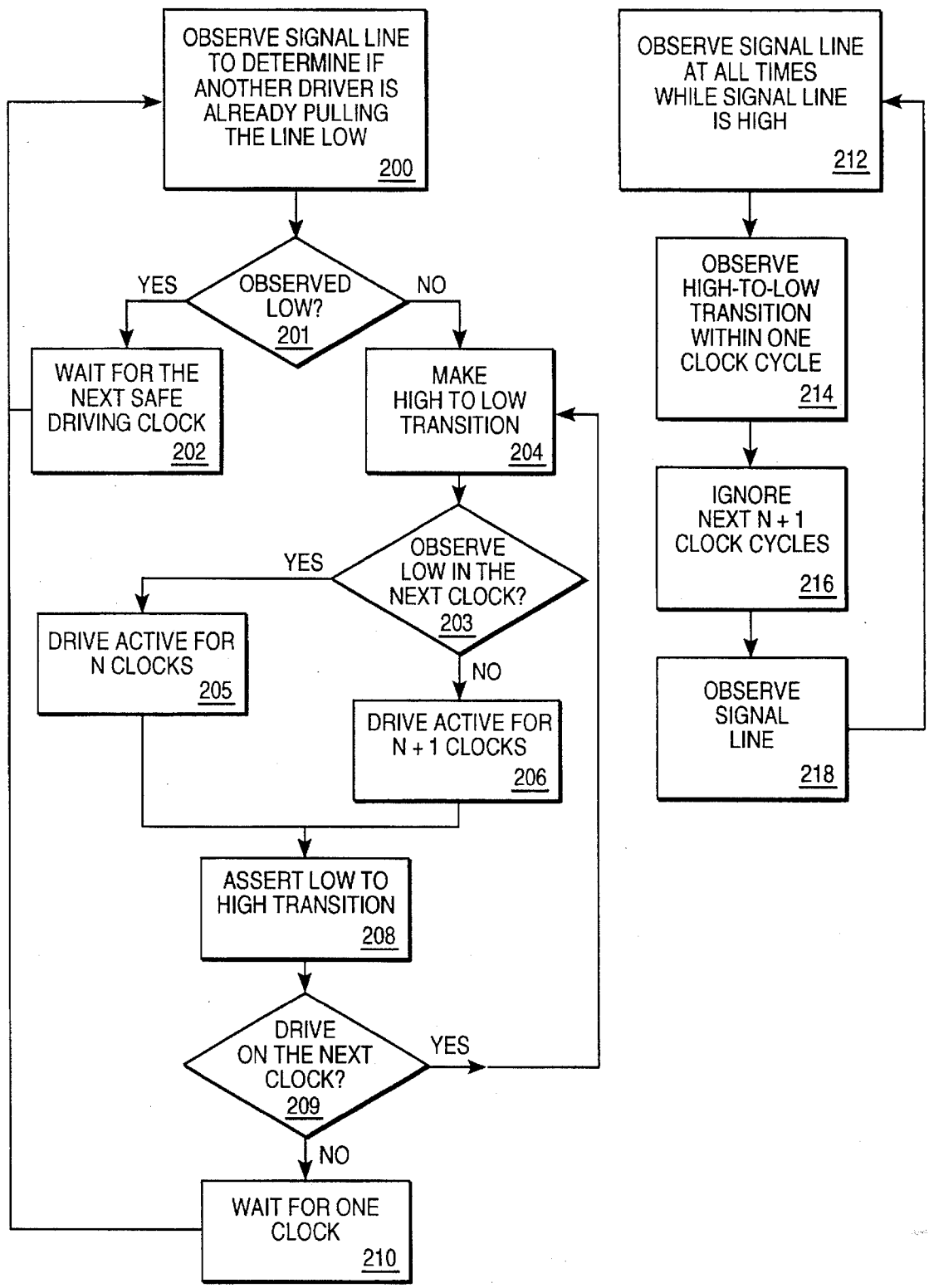
FIG_5

|  | T0 | T1 | T2 | T3 | T4 | T5 | T6 | T7 | T8 | T9 |
|---|---|---|---|---|---|---|---|---|---|---|
| DRIVER #1 | H | H | H | H | H | H | H | H | H | |
| DRIVER #2 | H | L | L | H | L | L | H | L | L | |
| ACTUAL MULTIPLE-DRIVER SIGNAL | H | L | L | H | L | L | H | L | L | |
| OBSERVER | | H | L | — | — | L | — | — | L | — |

FIG_5

|  | T0 | T1 | T2 | T3 | T4 | T5 | T6 | T7 | T8 | T9 | T10 |
|---|---|---|---|---|---|---|---|---|---|---|---|
| DRIVER #1 | H | H | L | H | L | L | H | H | L | L | H |
| DRIVER #2 | H | L | L | H | L | L | H | H | H | L | H |
| ACTUAL MULTIPLE-DRIVER SIGNAL | H | L | L | H | L | L | H | H | L | L | H |
| OBSERVER | — | H | L | — | — | L | — | — | H | L | — |

FIG_7

| | T0 | T1 | T2 | T3 | T4 | T5 | T6 | T7 | T8 | T9 |
|---|---|---|---|---|---|---|---|---|---|---|
| DRIVER #1 | H | H | H | H | H | H | L | L | H | |
| DRIVER #2 | H | L | L | H | H | H | H | H | H | H |
| ACTUAL MULTIPLE-DRIVER SIGNAL | H | L | L | H | H | H | L | L | H | H |
| OBSERVER | | H | L | — | — | H | H | L | — | — |

FIG_X

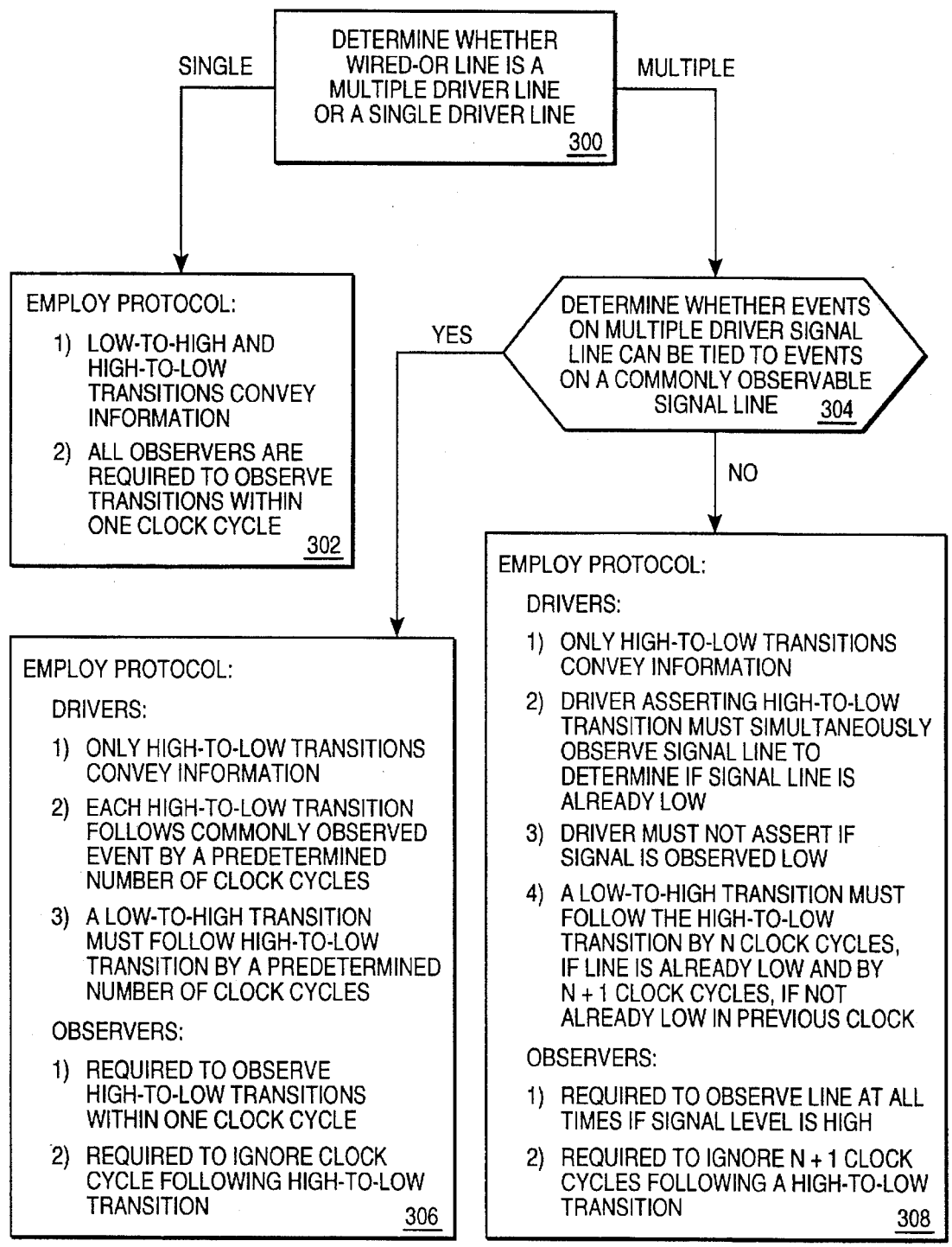
FIG_9

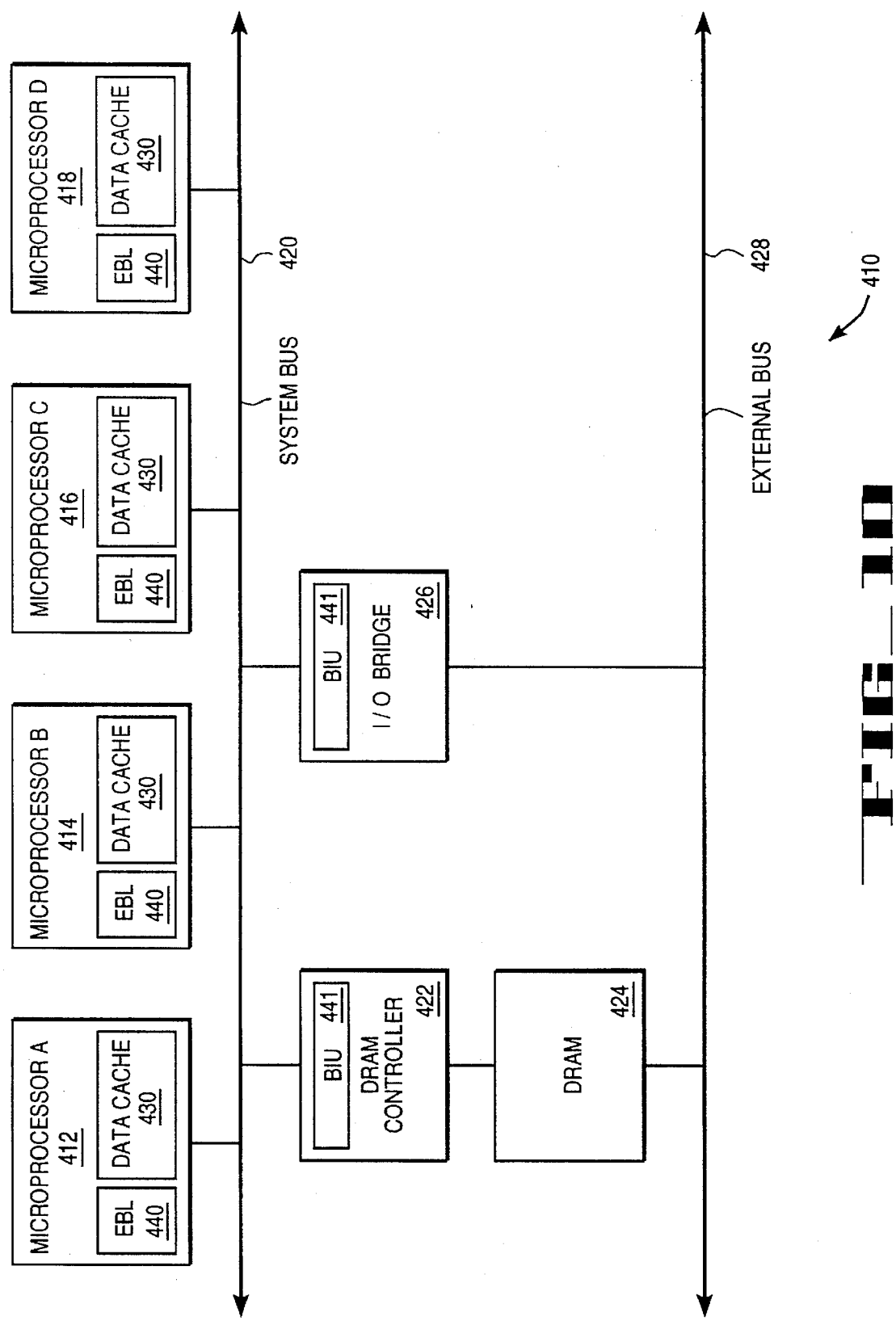
FIG_10

METHOD AND APPARATUS FOR TRANSMITTING INFORMATION ON A WIRED-OR BUS

BACKGROUND OF THE INVENTION

1. Field of the Invention

The invention generally relates to bus systems for transmitting information and, in particular, to a wired-OR bus system having multiple-driver signal lines.

2. Description of Related Art

Bus systems are commonly used for transmitting information between devices within a computer system or similar systems. Within a computer system, individual devices which transmit information over the bus may include, for example, one or more microprocessors, dynamic random access memory chips (DRAM), I/O bridges and the like. For generality and clarity, any of the various devices connected to a bus will be referred to herein merely as bus agents, unless otherwise noted.

It is desirable to transmit information from one bus agent to another as quickly as possible. The rate by which information signals may be transmitted on a bus is fundamentally limited by the electrical or physical characteristics of the bus as well as by other factors. For example, the rate of information transmission is fundamentally limited by the propagation time T required to transmit a signal from a driver on the bus to a receiver on the bus. If a signal can be observed within one propagation delay time T by every observer agent on the bus, the bus system is capable of "incident wave switching", which represents a desirable high transmission rate. However, other electrical limitations can prevent a bus system from employing incident wave switching. One such limitation is that signal transitions on the bus from one voltage level to another require a minimum period of time to settle. Typically, a sharp transition is followed by a set of voltage swings or oscillations. The voltage swings following a sharp transition are often sufficient to swing the voltage past the threshold voltage. Accordingly, agents connected to the bus must be capable of distinguishing between intended voltage transitions and voltage swings occurring before the voltage level adequately settles. If the voltage oscillations fall below the threshold it may prevent a receiver on the bus from being able to detect a signal within the time required by incident wave switching.

The foregoing problem is typically solved merely by defining a clock signal which has a period longer than the settling time for the voltage transitions. All intended transitions are required to be asserted onto the bus at one of the low to high transitions of the clock signal so that agents observing signal transitions can observe those transitions the next low to high transition of the clock. By choosing a sufficiently long clock period, it can be guaranteed that a signal transition is adequately stabilized so that it is observed by the receivers. Typically, the clock period is set to 2T+k, where k is a constant related to output buffer delays, clock to output gate delays, input buffer delays and input set-up times. However, the foregoing solution is only effective in bus systems wherein only a single bus agent is allowed to assert signals onto a bus line at any given time. Other bus systems allow two or more bus agents to assert signals onto a single line simultaneously. An example of such a bus system is a wired-OR bus system employing Gunning transceiver logic (GTL). In a wired-OR system, an active signal is defined as a low voltage level on a signal line. Each bus agent includes a wired-OR bus driver which is capable of asserting an active signal onto the bus line by pulling down the voltage onto the bus line. In this manner, any single agent or any number of agents can assert an active signal onto the line by merely pulling the voltage down to a low voltage level. Each bus agent also includes a wired-OR bus receiver which detects the voltage level on the signal line. The signal detected by the wired-OR receiver effectively represents the OR-combination of signals asserted by all of the bus agents, hence the name wired-OR.

Sharp signal transitions on a wired-OR bus result in voltage swings, as described above. However, in a wired-OR bus, voltage swings may occur even under circumstances wherein no voltage transition is intended. This problem is generally referred to as the "wired-OR glitch" and it imposes a further constraint on the ultimate speed of data transition, which may not be present in a non-wired-OR bus system. The wired-OR glitch occurs if several bus agents assert a low to high signal transition simultaneously while additional bus drivers continue to drive a low voltage level. Since at least some of the bus agents continue to drive the bus low, the state of the bus should remain low and no threshold voltage transitions should occur. Nevertheless, as a result of the fact that some of the agents are attempting to assert a low to high transition by releasing the signal line, a set of significant voltage swings occur which could be misinterpreted as an intended voltage level transition. In other words, even though the signal level is intended to remain low and even though at least some of the agents continue to pull down the voltage to a low level, anomalous low to high and high to low voltage transitions can nevertheless occur, causing a wrong interpretation by some of the receivers.

One solution to the wired-OR glitch problem is to simply limit, by protocol, that no two bus agents can assert signals at the same time on the wired-OR signal line. A signal line wherein only a single bus driver can assert a signal at any particular time is referred to as a single driver bus line. Although the foregoing eliminates any wired-OR glitch problem, a single driver signal line is incapable of benefiting from the advantages of wired-OR technology which inherently allow for multiple bus agents to drive signals at the same time. To allow multiple drivers and to avoid signal settling problems, the clock rate is typically set to be sufficiently slow to allow for the wired-OR glitch oscillations, and other oscillations, to decay before any additional signals are asserted. Typically, the clock period is set to be at least equal to 2T+k. However, such results in a substantially slower clock rate than can be employed on single driver signal lines and does not meet the criterion for incident wave switching.

It would be desirable to provide a method and apparatus for transmitting signals on a wired-OR bus line which allows for multiple bus drivers to assert signals simultaneously while also employing a clock period smaller than 2T+k and meeting the criterion for incident wave switching. It is to this end that aspects of the present invention are drawn.

SUMMARY OF THE INVENTION

A method and apparatus for transmitting signals over a wired-OR bus line is provided. In accordance with one aspect of the invention, a signal transmission protocol is provided for use by bus agents connected to a wired-OR bus wherein the wired-OR bus includes at least some single driver lines and at least some multiple driver lines. In accordance with one aspect of the protocol, only high to low signal transitions are defined to be valid events on the multiple driver wired-OR signal lines. The low to high signal transitions of the multiple driver signal are defined to be invalid events. This allows bus agents connected to the multiple driver signal line to predictably determine when such transitions are likely to occur and to ignore low to high signal transitions. By eliminating the low to high transitions from the protocol, the lengthy settling time associated with low to high transitions can be largely avoided, resulting in a high permissible clock rate. Preferably, the bus employs a clock signal having a clock rate based on the settling times of high to low signal transitions rather than on low to high transitions. The details of the settling times resulting from low to high and high to low transitions will be set forth below. However, it is worth noting that low to high transitions can result in settling times nearly twice as long as those of low to high transitions such that the clock period of the bus system of the invention can be set, for example, to T+k, rather than to 2T+k, where k is determined in accordance with the above-listed factors.

In accordance with yet another aspect of the invention, a protocol is provided wherein the assertion and observation of the events on a multiple driver signal line are correlated with a commonly observable event such as an event occurring on a selected single-driver line. As an example, in a bus system interconnecting a plurality of microprocessors, each having an independent data cache, a hit signal provided along a multiple driver signal line is correlated with an address strobe signal provided along one of the single driver signal lines. The occurrence of the address strobe signal on the single driver line is used to define a clock edge for asserting a hit signal onto the multiple driver hit line and to define a sampling window for use in observing the hit signal occurring on the multiple driver signal line. In this manner, a precise time is defined for asserting and observing signals on multiple driver signal lines such that anomalous transitions, perhaps occurring as a result of the wired-OR glitch, can be properly ignored.

In accordance with yet another aspect of the invention, a protocol is provided for asserting and observing signals on a multiple driver signal line which cannot be correlated to a commonly observable event. A bus agent asserting a low signal state on the multiple driver signal line must simultaneously determine whether another bus agent had previously asserted a low signal state. The bus agent is then required to release the signal line after a predetermined number of clock cycles which depends on the determination of whether another agent had already asserted a low signal. In this manner, if two or more agents assert a low signal at the same time, the clock cycle for a subsequent low to high transition may be predetermined. Observers are required to observe the bus multiple driver line at all times when the line is in the high state. Upon the detection of a low state, the observers than ignore subsequent activity on the multiple driver line until after the predetermined clock cycle for asserting the low to high transition. Bus observers then continue to observe the high state awaiting another transition to the low state. Since the clock cycle for the low to high transition is predetermined based on the initial occurrence of a high to low transition on the multiple driver signal line, observers can properly ignore signal transitions occurring immediately following the low to high transition. As an example, a bus system is provided wherein the bus error signals are asserted on multiple driver signal lines by one or more bus agents. The bus error signals are not necessarily correlated with any specific event occurring on a single driver signal line. Time windows for observing and responding to the error signals are defined with respect to a clock cycle during which one of the bus agents first asserts an error signal.

In its various embodiments, the invention provides methods and apparatus for transmitting information over wired-OR bus lines wherein, by following certain protocols, signals can be transmitted on multiple driver signal lines without conflict while also achieving an optimal clock rate. In particular, by recognizing and avoiding wired-OR glitches and other signal anomalies, the overall clock rate of the bus system can be set to an optimal level while signals are asserted and observed without conflicts or bottlenecks occurring. In a preferred embodiment, the invention is exploited within a computer system having multiple microprocessors each configured in accordance with Intel architecture. However, in other embodiments, the invention may be exploited within computer systems employing only a single microprocessor or in systems employing reduced instruction set (RISC) microprocessors. The invention may also be exploited within non-computer systems. Specific exemplary embodiments of the invention will be described below with reference to the figures.

BRIEF DESCRIPTION OF THE DRAWINGS

FIG. 1 is a block diagram of a bus system employing a wired-OR signal bus.

FIG. 2 is a timing diagram illustrating an example set of signals on a single driver wired-OR signal line.

FIG. 3 is a flow chart illustrating the application of a protocol for transmitting and receiving signals on a multiple driver wired-OR signal line wherein the assertion of signals on the multiple driver signal line is correlated with signals occurring on a single driver signal line.

FIG. 4 is a timing diagram illustrating an example set of signals on a multiple-driver wired-OR signal line subject to the protocol of FIG. 3.

FIG. 5 is a flow chart illustrating the application of a protocol for transmitting and receiving signals on a multiple driver wired-OR signal line wherein the assertion of signals on the multiple driver signal line is not correlated with signals occurring on a single driver signal line.

FIG. 6 is a timing diagram illustrating a first example set of signals on a multiple-driver wired-OR signal line subject to the protocol of FIG. 5.

FIG. 7 is a timing diagram illustrating a second example set of signals on a multiple-driver wired-OR signal line subject to the protocol of FIG. 5.

FIG. 8 is a timing diagram illustrating a third example set of signals on a multiple-driver wired-OR signal line subject to the protocol of FIG. 5.

FIG. 9 is a flow chart illustrating a methodology for determining a protocol for applying to wired-OR signal lines within a bus system.

FIG. 10 is a block diagram of a computer system employing the bus protocol illustrated in FIGS. 2–8.

DETAILED DESCRIPTION OF PREFERRED

Embodiments of the Invention

Referring to the figures, preferred embodiments of the invention will now be described. First, general considerations of multiple driver, wired-OR bus signals will be described with reference to FIG. 1. Then, high level protocols for use with multiple driver wired-OR bus systems will be described with reference to FIGS. 2–8. A specific example of a multiple driver wired-OR bus system will be described with reference to the remaining figures.

Multiple-driver Wired-OR Bus Signal Analysis
Results

FIG. 1 illustrates a generalized bus system 10 having a set of N bus agents, generally denoted 12 interconnected with a wired-OR bus 14. Each agent includes a bus interface unit (BIU) 15 which provides an interface between internal logic of the bus agent and bus 14. Wired-OR bus 14 includes a set of individual signal lines, at least a portion of which are multiple driver signal lines (not separately shown). Signal transitions asserted by one of the bus agents onto bus 14 require a certain amount of settling time. More specifically, a sharp high to low or low to high voltage transition on bus 14 results in a set of voltage swings which require a certain amount of time to decay to an acceptable level. For example, the high voltage level may be defined as 1.2 volts, the low voltage level as 0.4 volts, and the threshold level as 0.8 volts. If the signal line is sampled and the voltage is found to be above (0.8+V margin) volts, the signal is considered to be inactive. If the voltage is found to be below (0.8−V margin) volts, the signal is considered to be active. In general, a sharp transition from high to low or from low to high will result in voltage swings which cross the threshold voltage of 0.8 volts, resulting in frequent transitions from active to inactive signal levels. The minimum time between sampling points on the signal line should be set such that the voltage settles either active or inactive before a second sampling point.

It has been determined that the amount of settling time depends upon the type of transition, i.e. high to low or low to high, as well as whether all bus agents are simultaneously asserting a transition or only a portion of the agents are simultaneously asserting a transition. As a result of analysis and simulation studies, four general categories of signal transitions were observed. In the following, the normalized flight time for an incident wave switched signal driver signal is assumed to be T. The following analysis applies to a multiple driver wired-OR bus line having an arbitrary number of drivers making high to low or low to high transitions from a quiescent state on a common bus signal line.

Case 1.

The quiescent condition is N wired-OR drivers driving the common signal line high. If all N drivers make a high to low transition on the same clock edge, then the amount of propagation time required for transmission of such a signal, based on the settling time of the signal, is less than or equal to T. Accordingly, the transmission is considered to be within the limits required by incident wave switching.

Case 2.

The quiescent condition is M wired-OR drivers driving low, with N−M drivers driving high. If N−M drivers make a high to low transition on the same clock edge while M drivers stay low, then the amount of propagation time required for transmission of the signal, based on the settling time of the signal, is less than or equal to T. Accordingly, this type of transition is considered to be also within the limits required by incident wave switching.

Case 3.

The quiescent condition is N wired-OR drivers driving low. If all N drivers make a low to high transition on the same clock edge, then the amount of propagation time required for transmission of the signal transition, based on the settling time of the signal, is greater than T but less than 2T. Accordingly, this type of transmission is considered outside the limits required by incident wave switching.

Case 4.

The quiescent condition is N wired-OR drivers driving low. If N−M drivers make a low to high transition on the same clock edge, while M drivers continue to drive low, then the amount of propagation time required for transmission of the signal transition, based on the settling time of the signal, is also greater than T but less than 2T. Again, this type of transmission is considered outside the limits required by incident wave switching.

Case 4 represents the wired-OR glitch case, wherein the intended state of the signal line remains active, but the release of the signal line by M of the drivers results in voltage level swings requiring a settling time greater than T. As can be appreciated from a consideration of the four cases, high to low transitions may be safely observed in a time period less than or equal to T. However, low to high transitions cannot be safely observed within a time period of T.

A set of protocols for use for transmitting signals on multiple driver wired-OR signal lines have been developed based on the observation of the four cases summarized above. High level bus protocol rules are set forth in the next section.

High Level Wired-OR Bus Protocol Rules

Referring to FIGS. 2–9, high level protocol rules for use on a wired-OR signal line will now be described.

A first general protocol rule is that, for multiple driver signal lines, only high to low signal transitions are allowed to define meaningful events. In other words, useful information is only asserted via high to low transitions. Low to high transitions are employed to reset the voltage to the high-level state immediately in the next clock, but are not employed for conveying information. By requiring that all meaningful events are represented by high to low transitions, those events can be safely observed within the incident wave switching time (T). To further exploit the faster settling time for high to low transitions, the following protocol rules are also employed for multiple driver lines: all bus agents are required to observe high to low transitions of multiple driver wired-OR signal lines in one clock cycle; and all bus agents are required to ignore activity on the multiple driver line during the clock cycle immediately following the clock cycle in which a high to low transition is observed. Note that this is the clock cycle in which the wired-OR signal is reset.

By applying these rules, the overall clock rate of the bus system can be set based on the transmission time for high to low transitions, rather than on the longer high to low transitions, and is preferably set to be equal to T+k. This is in contrast to conventional systems which would require a clock period of at least 2T+k to accommodate the transmission of information on low to high signal transitions.

Single-driver Wired-OR Bus Line

Before describing the protocol rules for multiple driver signal lines, it is first worth describing a single driver signal line. A single driver signal line example is set forth in FIG. 2. In particular, FIG. 2 illustrates the high or low logic states asserted by the single driver of the bus line, the resulting state of the signal line, and the state of the signal line as it is observed by an observer. Because the single driver line of FIG. 2 has only a single signal driver, the state of the bus line corresponds to the state asserted by the single driver. The state observed by the bus observer lags behind the state asserted by the driver by one clock cycle. This is a result of the time lag occurring from transmission to observation along the bus line.

The bus driver asserts a low signal state (active) by pulling-down the voltage on the wired-OR signal line at selected clock cycles. The driver asserts a high signal state (inactive) by releasing the signal line at selected clock cycles. All observers observe the state of the single line within one clock cycle. Because there is only a signal driver, wired-OR glitch problems do not occur and the signal can be safely observed by all observers at each clock cycle. Accordingly, there are no general protocol limitations on what signal states can be asserted by the signal driver at each clock cycle. As such, each clock cycle can represent the transmission of a unit of meaningful information. Because meaningful information can be asserted at each clock cycle, the rate of information exchange is one unit of information per one clock cycle. This is important to note since it will be contrasted with the information flow rate for multiple driver signals described below.

There are no general protocol limitations to the assertion of signals onto the single driver wired-OR bus system. The only general protocol limitation for bus observers is that the observers must observe signal transitions within one clock cycle. Of course, a specific bus system may impose particular protocol limitations in accordance with the type of information to be transmitted over the signal line. As an example, if the single driver line is a data line, substantial protocol limitations may be employed to define when, and how, the driver can transmit data.

Multiple-driver Wired-OR Bus Line

Thus, for the single driver wired-OR line, bus agents may safely observe the state of the signal line at each clock cycle. For multiple driver signal lines, as a result of the signal settling problems described above, bus agents cannot necessarily observe the state of the signal line at each clock cycle and be assured that the observed state is the correct state. For example, immediately following a low to high transition, bus agents cannot safely observe the state of the bus, as a result of significant voltage swings following the low to high transition. Furthermore, bus agents cannot safely observe the state of the bus after any low bus state is observed. The foregoing is a result of the wired-OR glitch which can occur even if the state of the bus is intended to remain low but at least some bus drivers stop pulling down the bus voltage. As a result of these factors, it is desirable to design a protocol for multiple driver signal lines which specifies when bus observers can safely observe the state of the bus and which defines when bus drivers can safely assert a signal transition onto the bus line.

In accordance with the invention, two distinct multiple driver wired-OR high level bus protocols are defined with the first protocol applying to a multiple driver line wherein events on the multiple driver fine can be tied to, or correlated with, commonly observable events occurring on, for example, a separate single driver line. The second protocol applies to a multiple driver line, wherein events on the multiple driver line cannot be tied to commonly observable events.

The first multiple-driver protocol requires that all high to low transitions on the multiple driver bus occur at a predetermined number of clock cycles from a commonly observable event on, for example, a single driver bus line. The protocol also requires that any driver asserting a high to low transition on the multiple driver line must assert a low to high transition on the following clock cycle. By requiring that bus drivers assert high to low transitions only after a predetermined number of clock cycles after a commonly observed event, all observers of the multiple driver line therefore know when an intended high to low transition, if any, will occur. The bus observers can therefore reliably ignore the multiple driver bus line at all other times.

FIG. 3 illustrates the first of the multiple driver high-level bus protocols for bus drivers and for bus observers wherein the multiple driver line is correlated with events on a commonly observable single driver line. The bus drivers must observe events on the correlated single driver line, 100, and detect a commonly observable event on the single driver line, 102. The bus driver responds to the commonly observable event, if at all, by asserting a high-to-low transition a predetermined number N of clock cycles following observation of the event, 104. Any driver asserting a low signal must assert a high signal on the following clock cycle, 106, (N+1). If another active transition is required, the driving bus agent asserts another high to low transition on the following clock cycle, 110, then immediately asserts another low to high transition, 112. The logical flow then returns to step 108 where it is determined whether yet another active transition is required. In FIG. 3, the clock cycle occurring at step 110 is identified as N+2m, where in m is a incremented value starting with 1. Hence, during a first iteration of steps 108, 110 and 112, m is set to one, and step 110 is performed at clock cycle N+2. During a second iteration, step 110 is performed at clock cycle N+4. Likewise, FIG. 3 indicates that step 112 is performed at clock cycle N+2m+1, such that step 112 is always performed one clock cycle following step 110.

For the observers, the single driver signal line must also be observed, 114, and the commonly observable event must be detected, 116. Once detected, the observer observes the multiple driver line after exactly N+1 clock cycles, knowing that a valid signal will be asserted on the multiple driver line, if at all, at that time, 118. The observer ignores the next clock cycle, 120 (N+2m). The observer can ignore that clock cycle because the observer knows, based on the protocol, that a low to high transition must occur, and therefore, there is no need to observe the transition. The observer then observes the multiple driver line on the clock cycle, 122 (N+2m+1). At 124, the observer determines if another high to low transition occurred as a result of the driver asserting another active signal. If the multiple driver line is found to be low (active), then the observer again ignores then next cycle, 120 and observes the following cycle, 122. If the multiple driver line is found to be in the high state, the observer ignores further signals on the multiple driver line until another event is required to be observed due to a new event occurring on the single driver line, 114. As with the driver portion of FIG. 3, steps 120, 122 and 124 of the observer portion include an increment value m, which is incremented with each iteration of steps 120, 122 and 124. For example, during the initial occurrence of step 120, m is equal to one and the clock cycle ignored at step 120 is clock cycle N+2. The clock cycle observed at step 122 is therefore clock cycle N+3 and a determination of whether an active or inactive signal is observed is also made at clock cycle N+3. During a second iteration, m is set to two, such that the clock cycle ignored at step 120 is clock cycle N+4.

N, the delay time between an observation of an event on the single driver line and the assertion of an active signal on the multiple driver line, depends in practical systems on how quickly bus agents can actually respond to the commonly observable event. N may be, for example, 1, 2, 10 or 100 clock cycles. In an exemplary system, described below, wherein the single driver signal is an address strobe signal and the multiple driver line is a hit line which provides hit information from a set of caches, the hit signal may be required to be asserted, if at all, exactly four clock cycles from the detection of the address strobe signal.

FIG. 4 sets forth an example set of signal transitions. In the example of FIG. 4, bus agents on the multiple driver line are constrained to asserting a low signal value one clock following the observation of a low signal value on a single signal line. In the example, the low signal event occurs on the single driver line at T0. A multiple signal line driver (DRIVER #1) observes the low signal on the single signal line at T1 and asserts a low signal onto the multiple driver line at T2. A second multiple signal line driver (DRIVER #2) also observes the single driver line but does not assert a low signal at T2. Observers of the bus system also observe the low signal state on the single signal line at T1 and determine that a low signal will be asserted, if at all, on the multiple driver signal line at a time observable at clock cycle T3. Accordingly, the observers of the multiple line ignore any signals occurring on that line prior to clock cycle T3, then observe the multiple driver line at clock cycle T3. The multiple driver line is observed to be low at clock cycle T3 and the observer thereby knows that one or both of the two agents asserted a low signal at clock cycle T2.

As noted above, the protocol also requires that any driver asserting a low signal onto the multiple driver line assert a high signal the following clock cycle. Accordingly, the observer of the multiple driver line ignores the multiple driver line at clock cycle T4 knowing that it will be high. The observer then observes the multiple signal line again at clock cycle T5 to determine if a second signal was asserted at clock cycle T4. In the example, a second active signal is not asserted at T4 and the signal line is therefore found to be inactive at T5. The observer however observes that another low signal event occurred on the single driver line at T4. The observer then ignores the multiple driver line until T7. The drivers also observed the occurrence of the low signal on the single driver line at T4 and both assert low signals at T6. The observer thereby observes the low multiple driver event at T7.

The observer then ignores further signals on the multiple driver line until another low signal event is detected, at T7, on the single driver line. Again, the observer ignores the multiple driver line on following clock cycle T8 but observes the multiple driver line again at clock cycle T9 and determines that a High signal was asserted by both drivers.

In the example, the event on the single driver line which triggers the assertion of signals on the multiple driver line is simply a single active signal. In practical systems, the event may be any combination of signals on one or more single driver lines and may alternatively be an event occurring on one or more multiple driver lines. The event can, in principle, be any commonly and reliably observable event.

As a result of the foregoing protocol constraints, meaningful signals can only be asserted onto the multiple driver signal line, at best, every other clock cycle. For example, if the commonly observable event on the single driver line occurs at every other clock cycle, then bus drivers on the multiple driver line can assert either a high or low signal in response to the commonly observable event, also at every other clock cycle. Accordingly, the observer of the multiple driver line observes the state of the line every second clock cycle and ignores the state of the line every other clock cycle. Hence, the maximum rate of information flow on the multiple driver signal line is one unit of information every two clock cycles. This is in contrast to the aforementioned single driver line wherein information may be transmitted at every clock cycle. Nevertheless, if all the high band-width signals are transmitted as single driver events at a clock period of T+k, rather than 2T+k, the real time information flow rate is considerably faster than a system which employs a slower clock rate but does not include the aforementioned multiple driver protocol.

Thus FIGS. 3 and 4 illustrate a protocol for transmitting signals on a multiple driver signal line wherein those signals can be correlated to a commonly observable event on a single driver signal line. By tying the assertion of signals on a multiple driver line to a commonly observable event on the single driver line, a crisp observation window is established for allowing bus agents to safely observe signals on the multiple driver signal line. FIGS. 5–8 illustrate a protocol for use on a multiple driver signal line which cannot be correlated to events on a single driver line. The protocol of FIGS. 5–8 applies where signals can be asserted on the multiple driver signal line at any time and wherein the bus employs a latched bus protocol wherein there are at least two clock cycles between the assertion of a signal by one agent and a responsive assertion by a second agent. In other words, if one agent asserts a high to low transition at clock cycle T1, a second agent cannot observe that transition until clock cycle T2 and cannot make a responsive signal assertion until clock cycle T3. The agent making the original assertion at clock cycle T1 does not observe the second agent's response until T4 and cannot respond to the second agent until T5.

Referring first to FIG. 5, the second protocol requires that an driver asserting a high to low transition onto the multiple driver line first observe the signal line to determine if another driver is already pulling the line low, 200. If the line is observed low, 201, then the driver must wait for the next safe driving clock, 202. Once the next safe driving clock is available, the driver again observes the signal line to determine whether another driver has already pulled the line low, 201. If, at step 200, the line is not observed low, then the driver asserts a signal by making a high to low transition on the next clock cycle, 204. At that clock cycle, the driver again observes the line to determine whether another agent had asserted its own high to low transition on the preceding clock cycle, 203. If another agent had asserted a high to low transition on the previous clock cycle, then the driver drives the signal line active for N clocks, 205. In other words, the driver continues to pull the signal line low for N clocks. If no other agent had asserted a high to low transition on a previous clock cycle, then the driver continues to drive an active signal for N+1 clocks, 206. The driver then asserts a low to high transition at 208. If the driver needs to assert another high to low transition on the next clock then process flow returns to step 204 where the high to low transition is asserted again. If the driver need not assert a second high to low transition after step 208, then the driver waits at least one clock cycle, 210, before returning to 200 to again observe the signal line.

The sequence of steps illustrated for the driver in FIG. 5 are based, in part, on the use of the latched bus protocol, wherein there are at least two clock cycles between the assertion of a signal by one driver and a responsive assertion by a second driver.

With the process flow of FIG. 5, it is guaranteed that all low to high transitions will occur at a predetermined number of clock cycles from the first assertion of the low signal. In other words, bus agents observing the multiple driver line can determine when a low to high transition will occur and can ignore signals on a signal line immediately following the low to high transition.

From the observer's standpoint, the observer observes the multiple driver signal line at all times while the signal is high (inactive), 212. The observer is required to observe any high to low transition within one clock cycle, 214. Then the observer ignores signals on the multiple driver signal line for N+1 clock cycles, 216, then again begins to observe the signal line, 218. As a result of these protocol limitations, an observer of the multiple bus line is capable of observing information events only once every three clock cycles. Of course, the observer can, and must, observe a continuous high clock state for as long as the driver line remains high, but the continuous high state does not convey information. As a result, meaningful information is observed only when a low state follows an observable high state or when a low or high state follows N consecutive ignored states.

FIGS. 6-8 illustrate examples for the three driver cases of the protocol of FIG. 5 where N=1. FIG. 6 illustrates the case where the driver determines, at step 203 of FIG. 5, that no other drivers had asserted an active signal on the previous clock cycle. In FIG. 6, a bus agent (driver 2) observes the signal line at T0 and determines that the line is high (step 201 of FIG. 5). Driver 2 then asserts a high to low transition at clock cycle T1. Simultaneously, driver 2 observes the signal line to determine whether any other drivers, for example driver 1, asserted a high to low transition at T0 (step 203 of FIG. 5). Having determined that no other bus agents had driven the line low on the previous clock cycle, driver 2 continues to assert a low signal for two clock cycles then asserts a high signal at clock cycle T3. Driver 2 then asserts another low signal at T4. Again, Driver 2 determines that the signal line had been high the previous clock cycle and therefore continues to assert the low signal until T5. The process repeats starting at T7.

As noted, the protocol requires that an observer observe the signal line at all times when the line is in the high state, but that it ignore two consecutive clock cycles following the assertion of a low signal state. Accordingly, the observer of FIG. 6 observes, at clock T2, the low signal state asserted by driver 2 at clock T1. The observer then ignores the next two clock cycles, T3 and T4, before again observing the signal line at T5. In the example of FIG. 6, the observer observes a low signal state at clock cycles T5 and T8, and ignores the two subsequent clock cycles after T5 and T8.

FIG. 7 illustrates the case for the driver wherein the driver determines, at step 203 of FIG. 5, that another driver had asserted a low signal on the previous clock cycle. In the example of FIG. 7, driver 1 attempts to assert a high to low transition at T2, but simultaneously observes that driver 2 had previously asserted a low signal state at clock cycle T1. Accordingly, driver 1 asserts a high signal state at clock cycle T3. As the result of the protocol rules already described with reference to FIG. 5, driver 2 also asserts a high state at time T3. Accordingly, the low to high transition asserted by both driver 1 and driver 2 occurs at both the same time, i.e., at a leading clock edge of clock cycle T2.

At T4 both drivers assert a low state and both determine that the line had not been asserted high on the previous clock cycle. Accordingly, the drivers continue to pull the line low until T6. The sequence of driver events at T4-T6 therefore correspond to the first case described above. Later, driver 1 asserts a low signal at T8, whereas driver 2 asserts a low signal at T9.

The observer, in the example of FIG. 7, observes, at time T2, the initial low state asserted by driver 2 at clock cycle T1. The observer then ignores observations at clock cycles T3 and T4 and again samples the signal line at clock cycle T5. Again the observer ignores the next to clock cycles, then observes a High signal state at T8 and a low at T9.

FIG. 8 illustrates a case where the driver determines, at step 201 of FIG. 5, that another driver was already pulling the multiple driver signal line low as observed at step 200. In the example of FIG. 8, driver 1 is interested in asserting a high to low signal transition at T3. Therefore, driver 1 observes the multiple driver signal at T2 to determine if another driver had already pulled the line low. In the example, since driver 2 had asserted a low signal at T1, driver 1 cannot assert its low signal at T3. Accordingly, driver 1 must wait until the next safe driving clock. Under the protocol, driver 1 is required to ignore signals on the multiple driver line at clock cycles T3 and T4. Hence, the next safe observation clock for observing the multiple driver signal line is at T5. At T5, driver 1 observes the signal line and determines that no drivers had asserted a low signal at T4. Based on that information, driver 1 then asserts a high to low transition at T6. At T6, driver 1 also observes the line to determine if any signals had been asserted at T5 and, having made a determination that no such signal was asserted, driver 1 then holds the signal line low for two clock cycles, in accordance with step 206 of FIG. 5.

Thus, FIG. 8 illustrates that a driving agent may be required to wait at least three clock cycles to assert a high to low transition.

Thus, FIGS. 6-8 illustrate examples of the application of the protocol rules for a multiple driver signal line wherein events cannot be tied to commonly observed events on a single driver signal line. Although FIGS. 6-8 illustrate only two drivers, and only a single observer, it should be understood that in practice numerous bus drivers and numerous observers are typically connected to a multiple driver bus. Each bus driver is also a bus observer. However, there may be some bus agents on the multiple driver line, which merely observe the line, but are not capable of asserting signals onto the line. Hence, in practice, numerous bus drivers may be attempting to assert active low states on the multiple driver line at any given clock cycle with the actual state of the signal line being the OR combination of all of the asserted signals. Nevertheless, following the protocol rules described above, all entities observing the bus can reliably observe the bus at times when the voltage signals on the bus are guaranteed to be sufficiently stable.

As noted, N can be set to an arbitrary number. A value of N=1 represents an optimal number allowing for the transmission of information at every third clock cycle. For N greater than 1, the amount of time during which bus observers ignore the state of the bus line is greater than 2 and therefore information is transmitted less than one unit per three clock cycles.

Thus, the foregoing illustrates generalized protocol rules for applying to multiple driver wired-OR signal lines. Of course, a practical information transmission system may be subject to numerous additional protocol limitations. Nevertheless, by applying the high level protocols described above, considerable improvement can be gained in overall transmission time as the result of the ability to decrease the overall clock period to about T+k rather than 2T+k. Whether the first general multiple driver protocol or the second general multiple driver protocol, described above, is applicable depends upon the particular details of a subject bus system. In some bus systems, it may be feasible to tie the assertion of active signals on every multiple driver line to commonly observable events such that the second general protocol is not required. In other bus systems, it may not be possible to tie any of the multiple driver lines to commonly observable events. In such case the second general protocol will be required for each multiple driver line. In general, some multiple driver lines will be subject to the first protocol while others will be subject to the second protocol.

In view of the foregoing, a general methodology for designing a multiple driver wired-OR bus system is provided. The general methodology is set forth in FIG. 9. First, one identifies which of the wired-OR lines are single driver lines and which are multiple driver lines, 300. If it is not possible for two or more drivers to simultaneously assert low to high transitions onto a bus line, then the line may be regarded as a single driver line, 304, and the single driver protocol is employed. If it is possible that two or more drivers will assert low to high transitions at about the same time then the signal line must be regarded as a multiple driver line. Next, at 304, it should be determined whether signals on the multiple driver line can be reliably correlated with commonly observable events such as signals on a separate single driver line. If such is the case, then the first general protocol should be implemented, 306. If signals on the multiple driver line cannot be reliably correlated with commonly observable events, then the second general protocol is applied, 308. Such a determination depends, of course, on the particular signals to be transmitted on the various lines. For example, the determination may depend on whether the multiple driver line transmits error signals, cache snoop hit signals, address strobe signals, or the like.

Accordingly, an improvement may be gained in most multiple driver wired-OR bus systems by modifying the protocol of the bus in accordance with the above-described rules and by setting the clock rate for the bus to T+k. Whether the protocol of any particular system can be easily modified depends upon the actual protocol of the system. Likewise, whether the clock rate can be doubled depends also upon other protocol and hardware constraints. Thus, the advantages gained by the foregoing modifications may not be applicable to all multiple driver bus systems, but instead represent a general methodology for improving bus performance where possible.

In certain circumstances, it may be sufficient to apply the protocol on a statistical, rather than determinative basis. As an example, if it is determined that it is highly unlikely, but nevertheless possible, that two or more drivers may assert low to high transitions on a single line at the same time, the line may be regarded as a single driver line. As such, certain circumstances may arise where two drivers will attempt to assert a low to high transition, perhaps resulting in a subsequently observed signal state being erroneous. So long as such an error can be reliably detected and corrected or ignored, the occasional violation of the protocol may not be harmful. In other words, it may be desirable to accept a certain error rate as a trade-off in gaining the advantages of the higher overall information transmission rate of a single driver transmission. In general, the overall effectiveness of the bus system may be optimized by selectively applying the foregoing general protocol rules.

Exemplary System

FIG. 10 illustrates a block diagram of a computer system configured in accordance with principles of the invention. Computer system 410 includes a set of four microprocessors 412, 414, 416 and 418, each connected to a system or CPU bus 420. Additional devices are also connected to the system bus including a DRAM controller 422 which is in turn connected to a DRAM 424. An I/O bridge 426 is also connected to system bus 420. I/O bridge 426 interconnects system bus 420 to an external bus 428 which may be, for example, an EISA bus. Peripheral devices (not shown), such as printers, modems, and the like, may be connected via external bus 428.

Each of microprocessors 412–418, DRAM controller 422, and I/O bridge 426 represents a bus agent connected to system bus 420. Additional bus agents, not shown, may also be connected to system bus 420. In one embodiment, a total of eight agents may be simultaneously connected to system bus 420. The total number of agents connectable to system bus 420 depends, for example, upon the electrical characteristics of the system bus. In other embodiments, more or fewer bus agents may be connectable directly to system bus 420. Each of microprocessors 412–418 may be identical or, depending upon the implementation, the various microprocessors may differ. In one implementation, each microprocessor is a complex instruction set computer (CISC) microprocessor configured in accordance with Intel Architecture. In other embodiments, the microprocessors may be reduced instruction set computer (RISC) microprocessors. In other implementations, only a single microprocessor may be connected to system bus 420.

Each processor has a data cache 430 and an external bus logic unit (EBL) 440. DRAM controller 422 and I/O bridge 426 both include a bus interface unit (BIU) 441. The EBL's of the microprocessors and the BIU's of the other bus agents provide an interface between the internal logic of the respective devices and bus 420. It is within the EBLs and the BIU's that the above-described bus protocol rules are exploited in connection with transmitting and receiving information. Preferably, the EBLs and BIUs include one or more state machines for tracking the high or low status of the various individual bus lines to facilitate the application of the bus protocol rules.

Bus 420 has a set of single driver signal lines including data, address and control lines, such as an address strobe line. The bus also includes cache snoop results signal lines HIT and HITM; error lines BINIT, BERR, AERR and a request stall signal line BNR (not specifically shown). All lines of the bus are wired-OR lines and the above-described protocol is applied. It is possible for each of the microprocessors to detect a cache hit within its cache and to assert a HIT, HITM snoop result signal onto the multiple driver lines at the same clock cycle. Therefore, the HIT/HITM lines are multiple-driver lines. It is also possible for error signals BERR/BINIT to be asserted at any time by any agents on the error lines. Therefore the error lines are also multiple driver lines. The hit signals are always asserted as the result of a data request and can be reliably correlated with the address strobe signal on the address strobe line. Since the hit lines are correlatable to a commonly observable signal on the address strobe line, the first case multiple driver protocol is applied to the hit lines. The error BERR/BINIT lines can be asserted at any time and are not correlatable to any commonly observable events on any of the other lines. Therefore, the second case multiple driver protocol is applied to the error lines. In the exemplary system, the protocol applied to the hit lines specifies that N (single driver delay)=3. The protocol applied to the error lines specifies that N (pulse width−1)=2.

What has been described is a method and apparatus for transmitting signals over a bus system having wired-OR signal lines, wherein a data transmission protocol is employed which exploits the quicker transmission time available for high to low signal transitions. By exploiting the protocol, the clock rate for the bus system may be set to T+k, thereby achieving a considerably faster clock rate than bus systems which set the clock rate based on the worst case signal transmission event, namely, low to high transitions. The bus protocol may be employed in a wide variety of bus systems, including computer bus systems. The general principles of the invention have been described with reference to exemplary protocols. It should be understood, however, that the general principles of the invention can be exploited to yield other protocols for use in other embodiments and for other applications.

What is claimed is:

1. A method for communicating information on a multiple-driver wired-OR signal line of a signal transmission bus that includes a clock line providing a clock signal, the bus having a plurality of bus agents connected thereto, said method comprising the steps of transmitting signals by:

observing a commonly observable event on said bus;

selectively asserting a high-to-low signal voltage transition onto said multiple-driver signal line, said high-to-low transition being asserted two clock cycles following observation of said commonly observable event; and if a high-to-low transition is asserted, then asserting a low-to-high signal voltage transition onto said multiple-driver signal line one clock cycle after assertion of said high-to-low transition.

2. The method of claim 1, further comprising the steps:

observing signals by observing said commonly observable event on said bus;

observing said multiple-driver signal line two clock cycles following observation of said commonly observable event;

transmitting additional signals by selectively asserting a second high-to-low signal voltage transition onto said multiple-driver signal line one clock cycle following assertion of said high-to-low transition; and if a second high-to-low transitions is asserted, then asserting a second low-to-high signal voltage transition onto said multiple-driver signal line one clock cycle following assertion of said second high-to-low transition.

3. The method of claim 1, wherein said commonly observable event is a transition on a single driver signal line, said bus interconnects a plurality of microprocessors each having a cache and wherein said single driver line is an address strobe line providing an address strobe signal from one of said microprocessors, and wherein said multiple-driver signal line is a hit line for providing a hit signal in response to a cache snoop hit detected in any of said microprocessors.

4. A method for communicating information on a multiple-driver wired-OR signal line of a signal transmission bus that includes a clock line and has a plurality of bus agents connected thereto, said method comprising the steps of transmitting signals by:

selectively asserting a high-to-low signal voltage transition on said multiple-driver signal line;

observing said multiple-driver signal line to determine if another bus agent had asserted a previous high-to-low transition within two clock cycles prior to said selective assertion of said high-to-low transition;

if another agent did not assert a previous high-to-low transition within two clock cycles, then asserting a low-to-high signal transition onto said multiple-driver line two clock cycles following said selective assertion of said high-to-low transition; and if another agent asserted a previous high-to-low transition within two clock cycles, then asserting a low-to-high signal transition onto said multiple-driver line two clock cycles following said selective assertion of said high-to-low transition.

5. An apparatus for communicating information on a multiple-driver wired-OR signal line of a signal transmission bus including a clock line, said apparatus having a means for transmitting signals comprising:

means for observing a commonly observable event on said bus;

means for selectively asserting a high-to-low signal voltage transition onto said multiple-driver signal line, said high-to-low transition being asserted two clock cycles following observation of said commonly observable event;

means for asserting a low-to-high signal voltage transition onto said multiple-driver signal line one clock cycle after assertion of said high-to-low transition;

means for selectively asserting a second high-to-low signal voltage transition onto said multiple-driver signal line one clock cycle following assertion of said high-to-low transition; and means for asserting a second low-to-high signal voltage transition onto said multiple-driver signal line one clock cycle following assertion of said second high-to-low transition.

6. The apparatus of claim 5, wherein said commonly observable event is on a single driver signal line, wherein said bus interconnects a plurality of microprocessors each having a cache and wherein said single driver line is an address strobe line providing an address strobe signal from one of said microprocessors, and wherein said multiple-driver signal line is a hit line for providing a hit signal in response to a cache snoop hit detected in any of said microprocessors.

7. An apparatus for communicating information on a multiple-driver wired-OR signal line of a signal transmission bus that includes a clock line, said apparatus having means for transmitting signals comprising:

means for selectively asserting a high-to-low signal voltage transition on said multiple-driver signal line;

means for observing said multiple-driver signal line to determine if another bus agent had asserted a previous high-to-low transition within two clock cycles prior to said selective assertion of said high-to-low transition;

means for asserting a low-to-high signal transition onto said multiple-driver line two clock cycles following said selective assertion of said high-to-low transition; and means for asserting a low-to-high signal transition onto said multiple-driver line two clock cycles following said selective assertion of said high-to-low transition.

8. A method for communicating information on a multiple-driver signal line of a signal transmission bus that includes a clock line and has a plurality of bus agents connected thereto, said method comprising the steps of transmitting signals by:

observing a commonly observable event;

selectively asserting a signal voltage transition of a first type onto said multiple-driver signal line, said transition being asserted two clock cycles following observation of said commonly observable event; and if a transition of said first type is asserted, then asserting a signal voltage transition of a second type onto said multiple-driver signal line one clock cycle after assertion of said transition of said first type.

9. A method for communicating information on a multiple-driver signal line of a signal transmission bus that includes a clock line and has a plurality of bus agents connected thereto, said method comprising the steps of transmitting signals by:

selectively asserting a signal voltage transition of a first type on said multiple-driver signal line;

observing said multiple-driver signal line to determine if another bus agent had asserted a previous transition of the first type within two clock cycles prior to said selective assertion of said transition of the first type;

if another agent did not assert a previous transition of the first type within two clock cycles, then asserting a signal transition of a second type onto said multiple-driver line two clock cycles following said selective assertion of said transition of said first type; and if another agent asserted a previous transition of said first type within two clock cycles, then asserting a signal transition of a second type onto said multiple-driver line two clock cycles following said selective assertion of said transition of the first type.

10. An apparatus for communicating information on a multiple-driver signal line of a signal transmission bus including a clock line, said apparatus having an element for transmitting signals comprising:

an element for observing a commonly observable event on said bus;

an element for selectively asserting a signal voltage transition of a first type onto said multiple-driver signal line, said transition of the first type being asserted two clock cycle following observation of said commonly observable event; and an element for asserting a signal voltage transition of a second type onto said multiple-driver signal line one clock cycle after assertion of said transition of the first type.

11. An apparatus for communicating information on a multiple-driver signal line of a signal transmission bus, said apparatus having an element for transmitting signals comprising:

an element for selectively asserting a signal voltage transition from a first voltage state to a second voltage state on said multiple-driver signal line;

an element for observing said multiple-driver signal line at all times when said signal line is in the first voltage state to determine if another bus agent had asserted a previous transition from the first voltage state to the second voltage state within two clock cycles prior to said selective assertion of said transition from the first voltage state to the second voltage state;

an element for asserting a signal transition from the second voltage state to the first voltage state onto said multiple-driver line two clock cycles following said selective assertion of said signal voltage transition from a first voltage state to a second voltage state;

an element for asserting a signal transition from the second voltage state to the first voltage state onto said multiple-driver line two clock cycles following said selective assertion of said transition from a first voltage state to a second voltage state; and an element for detecting a signal voltage transition from the first voltage state to the second voltage state on said signal line, said element for observing observing said multiple-driver signal line two clock cycles following detection of said signal voltage transition.

12. Within an information transmission system for transmitting information along a communication line, wherein information is transmitted by asserting events of first and second types onto the communication line in synchronization with a clock and wherein events of the first type can be reliably observed after one half of a cycle of the clock and events of the second type can be reliably observed after one cycle of the clock, an improvement comprising:

asserting meaningful information only by way of asserting an event of the first type.

13. A method for communicating information on a multiple-driver wired-OR signal line of a bus having a plurality of bus agents connected thereto, the method comprising the steps of:

observing a commonly observable event on the bus;

selectively asserting a high-to-low signal transition onto the multiple-driver signal line two clock cycles following observation of the commonly observable event; and if a high-to-low transition is asserted, then asserting a low-to-high signal transition onto the multiple-driver signal line one clock cycle after assertion of the high-to-low transition.

14. A method for communicating information on a multiple-driver wired-OR signal line of a bus having a plurality of bus agents connected thereto, the method comprising the steps of:

observing a commonly observable event on the bus;

observing the multiple-driver signal line within one clock cycle following observation of the commonly observable event;

asserting a first high-to-low signal transition onto the multiple-driver signal line two clock cycles following observation of the commonly observable event;

ignoring events on the bus for one clock cycle following assertion of the first high-to-low transition;

asserting a low-to-high signal transition onto the multiple-driver signal line one clock cycle after assertion of the first high-to-low transition;

asserting a second high-to-low signal transition onto the multiple-driver signal line one clock cycle following assertion of the first high-to-low transition; and asserting a second low-to-high signal transition onto the multiple-driver signal line one clock cycle following assertion of the second high-to-low transition.

15. A method for communicating information on a multiple-driver wired-OR cache hit line of a bus interconnecting a plurality of microprocessors with caches, the bus including a clock line, the method comprising the steps of:

observing a transition on an address strobe line of the bus;

asserting a high-to-low signal transition onto the hit line two clock cycles following observation of the transition; and asserting a low-to-high signal transition onto the multiple-driver signal line one clock cycle after assertion of the high-to-low transition.

16. A method for communicating information on a multiple-driver wired-OR signal line of a bus having a plurality of bus agents connected thereto, the method comprising the steps of:

asserting a second high-to-low transition on the multiple-driver wired-OR line;

observing the multiple-driver line to detect the assertion of a first high-to-low signal transition within two clock cycles prior to the second high-to-low transition;

if assertion of the first transition is not detected, asserting a low-to-high signal transition onto the multiple-driver line two clock cycles after assertion of the second high-to-low signal transition; and if assertion of the first transition is detected, asserting a low-to-high signal transition onto the multiple-driver line one clock cycle after assertion of the second high-to-low signal transition.

17. An apparatus for communicating information on a multiple-driver wired-OR signal line of a bus, comprising:

means for observing a commonly observable event on the bus;

means for asserting a first high-to-low signal transition onto the multiple-driver signal line two clock cycles after observation of the commonly observable event; and means for asserting a first low-to-high signal transition onto the multiple-driver signal line one clock cycle after assertion of the first high-to-low transition.

18. An apparatus for communicating information on a multiple-driver wired-OR hit line of a bus interconnecting a plurality of microprocessors with caches, comprising:

means for observing an address strobe on a single driver line of the bus;

means for asserting a first high-to-low signal transition onto the hit line a first predetermined amount of time after observation of the commonly observable event; and means for asserting a first low-to-high signal transition onto the hit line a second predetermined amount of time after assertion of the first high-to-low transition.

19. An apparatus for communicating information on a multiple-driver wired-OR signal line of a bus, comprising:

means for asserting a high-to-low signal transition on the multiple-driver signal line;

means for observing the multiple-driver signal line to determine if another bus agent had asserted a previous high-to-low transition one clock cycle prior to the assertion of the high-to-low transition;

means for asserting a low-to-high signal transition onto the multiple-driver line two clock cycles following the assertion of the high-to-low transition; and means for asserting a low-to-high signal transition onto the multiple-driver line one clock cycle following the assertion of the high-to-low transition.

20. A method for communicating information on a multiple-driver signal line of a bus having a plurality of bus agents connected thereto, the method comprising the steps of:

observing a commonly observable event;

asserting a signal transition of a first type onto the multiple-driver signal line two clock cycles after observation of the commonly observable event; and asserting a signal transition of a second type onto the multiple-driver signal line one clock cycle after assertion of the transition of the first type.

21. A method for communicating information on a multiple-driver signal line of a bus having a plurality of bus agents connected thereto, the method comprising the steps of:

asserting a signal transition of a first type on the multiple-driver signal line;

observing the multiple-driver signal line to determine if another bus agent had asserted a previous transition of the first type within one clock cycle prior to the assertion of the transition of the first type;

if another agent did not assert a previous transition of the first type within one clock cycle, then asserting a signal transition of a second type onto the multiple-driver line two clock cycles following the assertion of the transition of the first type; and if another agent asserted a previous transition of the first type within one clock cycle, then asserting a signal transition of a second type onto the multiple-driver line one clock cycle following the assertion of the transition of the first type.

22. An apparatus for communicating information on a multiple-driver signal line of a bus, comprising:

an element for observing a commonly observable event on the bus;

an element for asserting a signal transition of a first type onto the multiple-driver signal line two cycles after observation of the commonly observable event; and an element for asserting a signal transition of a second type onto the multiple-driver signal line one clock cycle after assertion of the transition of the first type.

23. An apparatus for communicating information on a multiple-driver signal line of a bus, comprising:

an element for observing the multiple-driver signal line at all times while the signal line is in a first state;

a second bus agent asserting a second signal transition of a first type on the multiple-driver signal line;

an element for observing the multiple-driver signal line to detect an assertion by a first bus agent of a first signal transition of the first type within one clock cycle prior to the second bus agent asserting the second signal transition of the first type;

an element for observing the multiple-driver signal line one clock cycle following detection of the first signal transition of the first type;

an element for asserting a signal transition of a second type onto the multiple-driver line two clock cycles following the assertion of the second signal transition of the first type.

24. Within an information transmission system for transmitting information along a communication line, wherein information is transmitted by asserting events of first and second types onto the communication line and wherein events of the first type can be reliably observed after a first period of time and events of the second type can be reliably observed after a second period of time, an improvement comprising:

asserting meaningful information only by way of the event having the shorter period of reliable observation time; and transmitting information in synchronization with a clock signal wherein a period of the clock signal is based upon the shorter period of reliable observation time.

25. The improvement of claim 24, wherein the period of the clock signal is set to twice the shorter period of reliable observation time.

26. A method for communicating information on a multiple-driver wired-OR bus, comprising:

responding to an assertion of a first active signal on a line by asserting a second active signal on the multiple-driver wired-OR bus for one clock cycle a predetermined number of clock cycles after the assertion of the first active signal; and responding to the assertion of the first active signal by monitoring the multiple-driver wired-OR bus for one clock cycle beginning after the predetermined number of clock cycles.

27. The method of claim 26, wherein:

the first active signal is an address strobe asserted on an address strobe line of the bus; and the second active signal is a hit signal indicating a hit to a microprocessor cache.

28. The method of claim 26, wherein the first and second active signals are low voltage signals.

29. A method for monitoring a multiple-driver wired-OR bus so as to observe only those transitions on the multiple-driver wired-OR bus that indicate meaningful information, comprising the steps of:

using a second bus agent to monitor the multiple-driver wired-OR bus a first time to detect an assertion by a first bus agent of a first active signal; and if the assertion of the first active signal is detected, waiting at least two clock cycles to allow an assertion by the second bus agent of a second active signal onto the multiple-driver wired-OR bus.

30. The method of claim 29, further comprising the steps of:

using the second bus agent to monitor the multiple-driver wired-OR bus a second time in a clock cycle following the assertion of the second active signal;

if an assertion of a third active signal by the first bus agent is detected, allowing the second bus agent to continue asserting the second active signal for a predetermined number of clock cycles;

if the assertion of the third active signal is not detected, allowing the second bus agent to continue asserting the second active signal for one clock cycle more than the predetermined number of clock cycles; and allowing the second bus agent to assert a fourth active signal only after deasserting the second active signal for at least one clock cycle and monitoring the multiple-driver wired-OR bus a third time.

31. A multiprocessor computer system, comprising:

a system bus, including a plurality of multiple-driver wired-OR lines and a plurality of single driver lines;

a microprocessor coupled to the system bus, comprising a cache and interface logic for communicating with other components of the system, the interface logic comprising:

logic responding to an assertion of a first active signal on a single driver line of the bus by asserting a second active signal on a multiple-driver wired-OR line of the bus for one clock cycle a predetermined number of clock cycles after the assertion of the first active signal; and logic responding to the assertion of the first active signal by monitoring the multiple-driver wired-OR line for one clock cycle beginning after the predetermined number of clock cycles.

32. The computer system of claim 31, wherein:

the first active signal is an address strobe and the single driver line is an address strobe line; and the second active signal is a hit signal indicating a hit to the cache.

33. The computer system of claim 31, wherein the first and second active signals are low voltage signals.

34. A multiprocessor computer system, comprising:

a system bus, including a plurality of multiple-driver wired-OR lines and a plurality of single driver lines; and a plurality of bus agents coupled to the system bus, each comprising interface logic for communicating with other bus agents of the system, the interface logic comprising:

logic that monitors the multiple-driver wired-OR bus a first time to detect a first assertion by a first bus agent of a first active signal; and logic causing a second bus agent to wait at least two clock cycles after the assertion by the first bus agent to assert a second active signal onto the multiple-driver wired-OR bus.

35. The computer system of claim 34, wherein the interface logic further comprises:

logic that monitors the multiple-driver wired-OR bus a second time in a clock cycle following the assertion by the second bus;

logic that allows the second bus agent to continue asserting the active signal for a predetermined number of clock cycles if a second assertion by the first bus agent is detected;

logic that allows the second bus agent to continue asserting an active signal for the predetermined number of clock cycles plus one clock cycle if the second assertion by the first bus agent is not detected; and logic that allows the second bus agent to assert a second active signal only after deasserting the active signal for at least one clock cycle and monitoring the multiple-driver wired-OR bus a third time.

* * * * *

UNITED STATES PATENT AND TRADEMARK OFFICE
CERTIFICATE OF CORRECTION

PATENT NO. : 5,659,689
DATED : August 10, 1997
INVENTOR(S) : Sarangdhar et al

It is certified that error appears in the above-identified patent and that said Letters Patent is hereby corrected as shown below:

In column 7, line 49, delete "fine" and insert --line--.

Signed and Sealed this

Thirteenth Day of October 1998

Attest:

BRUCE LEHMAN

Attesting Officer

Commissioner of Patents and Trademarks